(12) United States Patent
Kawai (10) Patent No.: US 10,432,108 B2
(45) Date of Patent: Oct. 1, 2019

(54) POWER SUPPLY SYSTEM

(71) Applicant: Murata Manufacturing Co., Ltd., Nagaokakyo-shi, Kyoto-fu (JP)

(72) Inventor: Koji Kawai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/277,030

(22) Filed: Feb. 15, 2019

(65) Prior Publication Data

US 2019/0181773 A1 Jun. 13, 2019

Related U.S. Application Data

(63) Continuation of application No. PCT/JP2017/030490, filed on Aug. 25, 2017.

(30) Foreign Application Priority Data

Sep. 5, 2016 (JP) .................................. 2016-172429

(51) Int. Cl.
*H02M 7/219* (2006.01)
*H02M 7/12* (2006.01)
(Continued)

(52) U.S. Cl.
CPC ............. *H02M 7/219* (2013.01); *H02J 1/102* (2013.01); *H02J 3/38* (2013.01); *H02J 9/061* (2013.01);
(Continued)

(58) Field of Classification Search
CPC ... H02M 2001/007; H02M 2001/0074; H02M 2001/0077
(Continued)

(56) References Cited

U.S. PATENT DOCUMENTS 7,298,601 B2 * 11/2007 Covi ....................... H02M 1/32
  323/272
9,653,947 B2  5/2017 Yoshida
(Continued)

FOREIGN PATENT DOCUMENTS

JP    2002034177 A    1/2002
JP    2009290918 A    12/2009
(Continued)

OTHER PUBLICATIONS

International Search Report issued for PCT/JP2017/030490, dated Sep. 19, 2017.
Written Opinion of the International Searching Authority issued for PCT/JP2017/030490, dated Sep. 19, 2017.

*Primary Examiner* — Gary A Nash
(74) *Attorney, Agent, or Firm* — Arent Fox LLP (57) ABSTRACT

A power supply system that includes a converter that converts an input alternating-current voltage into a direct-current voltage and outputs the direct-current voltage to a load. The system includes a switcher that electrically connects one of multiple alternating-current power supplies to the converter, a voltage detector that detects an input voltage input to the converter, and a current detector that detects an output current output from the converter. The switcher repeats, for a predetermined amount of time, a determination of whether there is an abnormality in alternating-current power supply based on the input voltage detected by the voltage detector. Moreover, if there is an abnormality, the switcher switches which alternating-current power supply is connected to the converter. Further, the switcher adjusts, based on the result of detection by the current detector, the amount of time for which the determination is performed.

16 Claims, 6 Drawing Sheets

(51) Int. Cl.
*H02J 1/10* (2006.01)
*H02J 3/38* (2006.01)
*H02J 9/06* (2006.01)
*H02M 3/155* (2006.01)
*H02M 7/08* (2006.01)
*H02M 1/00* (2006.01)

(52) U.S. Cl.
CPC ............ *H02M 3/155* (2013.01); *H02M 7/08* (2013.01); *H02M 7/12* (2013.01); *H02M 2001/007* (2013.01); *H02M 2001/0074* (2013.01); *H02M 2001/0077* (2013.01)

(58) Field of Classification Search
USPC ....... 323/271, 272, 274, 277; 363/69, 70, 89
See application file for complete search history.

(56) References Cited

U.S. PATENT DOCUMENTS

| | | | |
|---|---|---|---|
| 2007/0064363 A1* | 3/2007 | Nielsen | H02J 9/061 361/90 |
| 2008/0129259 A1* | 6/2008 | Endo | H02M 3/1584 323/271 |
| 2016/0036269 A1* | 2/2016 | Yoshida | H02J 9/061 307/65 |

FOREIGN PATENT DOCUMENTS

| | | |
|---|---|---|
| JP | 2012217299 A | 11/2012 |
| JP | 2016036216 A | 3/2016 |

* cited by examiner

POWER SUPPLY SYSTEM

CROSS REFERENCE TO RELATED APPLICATION

The present application is a continuation of PCT/JP2017/030490 Aug. 25, 2017, which claims priority to Japanese Patent Application No. 2016-172429, filed Sep. 5, 2016, the entire contents of each of which are incorporated herein by reference.

TECHNICAL FIELD

The present invention relates to a power supply system that supplies voltage to a load from one of a plurality of alternating-current power supplies.

BACKGROUND

Patent Document 1 discloses a distributed power supply device that supplies alternating-current power to a home load in conjunction with a commercial electric power system. The power supply device described in Patent Document 1 is installed in areas where an abnormality in input voltage frequently occurs due to momentary interruption (such as momentary voltage drop or momentary power failure) of the commercial electric power system or other causes. With the power supply device, if the pattern of occurrence of abnormality type and characteristic values upon each detection of an abnormality matches a pre-stored time-series occurrence pattern of abnormality type and characteristic values, it is determined that a device failure has occurred. After the determination, the device is restarted or completely stopped.

Patent Document 1: Japanese Unexamined Patent Application Publication No. 2009-290918.

Some power supply systems required to have high reliability are often designed with redundancy to allow selection of a plurality of commercial electric power systems in anticipation of an interruption of power supply from a commercial electric power system due to a power failure or other causes. A mechanical relay switch is used to switch between the commercial electric power systems. Switching a mechanical relay switch many times can potentially lead to reduced product lifetime or reliability. For this reason, it is desired to avoid frequent switching of the mechanical relay switch. If, to this end, the number of times to execute abnormality determination is reduced while maintaining the amount of time spent on each single abnormality determination, this can potentially lead to reduced accuracy of abnormality determination, making it impossible to take an appropriate measure in the event of an abnormality.

SUMMARY OF THE INVENTION

Accordingly, it is an object of the present disclosure to provide a power supply system that optimizes, in accordance with the system configuration/load condition of an alternating-current power supply, the amount of time for which abnormality determination is performed to thereby enable accurate abnormality determination and maintain the supply of power to a load.

A power supply system according to an exemplary embodiment includes a converter unit that converts an input alternating-current voltage into a direct-current voltage and outputs the direct-current voltage to a load, a plurality of AC-DC converters, the plurality of AC-DC converters being arranged in parallel so as to convert a common alternating-current input voltage into a common direct-current output voltage, an operation control unit that controls operation or stoppage of the plurality of AC-DC converters based on a state of the load, a switch element that electrically connects one of a plurality of alternating-current power supplies to the converter unit, an input voltage detector that detects an input voltage input to the converter unit, an output current detector that detects an output current output from the converter unit, an abnormality determining unit that repeats, for a predetermined amount of time, a determination of whether there is an abnormality in alternating-current power supply based on an input voltage detected by the input voltage detector, a switching control unit that, if the abnormality determining unit determines that there is an abnormality, switches the switch element to switch which one of the plurality of alternating-current power supplies is connected to the converter unit, and a time adjustment unit that adjusts the predetermined amount of time in accordance with a detection value detected by the output current detector.

According to this configuration, it is determined whether there is an abnormality in the alternating-current power supply connected to the converter unit, and if it is determined that there is an abnormality, the alternating-current power supply to be connected to the converter unit is switched to another alternating-current power supply. Consequently, for example, for cases where it is necessary to keep the load driven at all times, the above-mentioned configuration helps prevent operation of the load from stopping as a result of voltage not being supplied to the load due to an abnormality in the alternating-current power supply.

The predetermined amount of time for which to execute this abnormality determination is adjusted in accordance with output current, that is, in accordance with whether the load is light or heavy. For example, if the load is light, the amount of time for which to execute the abnormality determination may be increased to thereby increase the accuracy of abnormality determination. This also helps reduce the frequency of switching of the switch element. If the load is heavy, the amount of time for which to execute the abnormality determination is decreased to thereby minimize malfunction or stoppage of the load caused by a decrease in the voltage supplied to the load. This makes it possible to accurately determine whether there is an abnormality in the alternating-current power supply, and maintain the supply of power to the load.

The time adjustment unit may decrease the predetermined amount of time if the value of output current detected by the output current detector is above a first threshold.

According to this configuration, if the load is heavy, the amount of time for which to execute the abnormality determination is decreased. This makes it possible to minimize malfunction or stoppage of the load caused by a decrease in the voltage supplied to the load.

The time adjustment unit may increase the predetermined amount of time if the value of output current detected by the output current detector is below a second threshold.

According to this configuration, if the load is light, the amount of time for which to execute the abnormality determination is increased. This makes it possible to increase the accuracy of abnormality determination. This configuration also helps reduce the frequency of switching of the switch element.

Preferably, the first threshold is the value of output current when all of the plurality of AC-DC converters are operating and when the load factor of each AC-DC converter is 50%.

Preferably, the second threshold is the value of output current when the operation control unit determines to stop one of the plurality of AC-DC converters.

The switch element may be a mechanical relay switch.

According to this configuration, the on-resistance is small, which makes it possible to minimize heat generation in the switch element.

The switch element may be a hybrid switch including a mechanical relay switch and a semiconductor switch.

Although a mechanical relay switch has a small on-resistance, it takes time for the mechanical relay switch to turn on. Accordingly, the above-mentioned configuration helps improve switching speed by use of a semiconductor switch, which is capable of switching at high speed.

In an alternative configuration of the power supply system, the power supply system includes a power storage device detachably connected in parallel to the converter unit, and a connection determining unit that determines whether the power storage device is connected. The time adjustment unit increases the predetermined amount of time if it is determined by the connection determining unit that the power storage device is connected, and decreases the predetermined amount of time if it is determined by the connection determining unit that the power storage device is not connected.

According to this configuration, if power supply to the load is being assisted by power from the power storage device, the amount of time for which to execute the abnormality determination is adjusted by taking this into account. Consequently, even if the load is heavy, the amount of time for which to execute the abnormality determination is increased in such a case. This makes it possible to increase the accuracy of abnormality determination, and also minimize the frequency of switching of the switch element.

According to the exemplary embodiments of the present disclosure, the amount of time for which to execute an abnormality determination is adjusted in accordance with whether the load is light or heavy, thus enabling accurate abnormality determination.

DETAILED DESCRIPTION OF EXEMPLARY EMBODIMENTS

Figure 1:
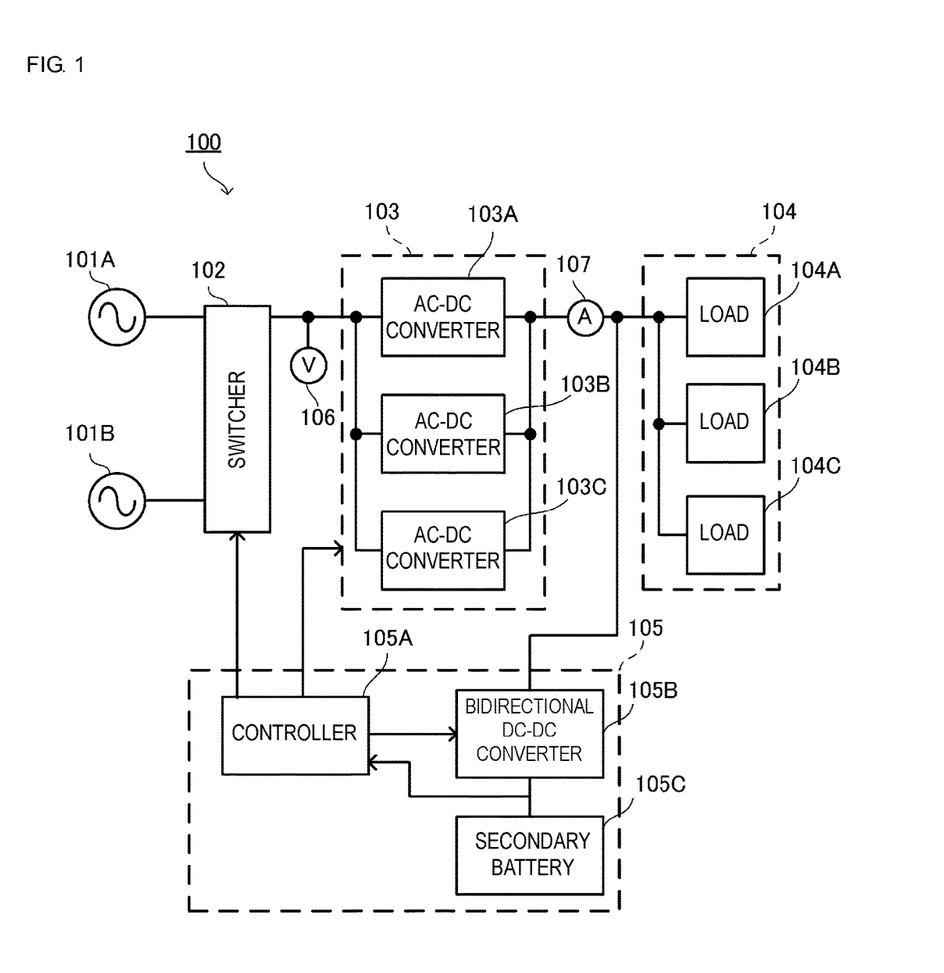
FIG. 1 is a block diagram of a power supply system according to an exemplary embodiment.

FIG. 1 is a block diagram of a power supply system 100 according to an exemplary embodiment.

The power supply system 100 includes commercial power supplies 101A and 101B, a switcher 102, a converter unit 103, loads 104A, 104B, and 104C, a battery module 105, a voltage detector 106, and a current detector 107.

The loads 104A, 104B, and 104C are, for example, blade servers, and housed in an enclosure. The loads 104A, 104B, and 104C, which are in parallel connection, are connected to the converter unit 103. The loads 104A, 104B, and 104C are powered from the converter unit 103. The loads 104A, 104B, and 104C will be hereinafter collectively referred to as load 104.

The switcher 102 is connected between the commercial power supplies 101A and 101B, and the converter unit 103. The switcher 102 electrically connects one of the commercial power supplies 101A and 101B to the converter unit 103. Each of the commercial power supplies 101A and 101B is connected to a different electric power system. Although described in more detail later, the switcher 102 has the following function: if there is an abnormality in one of the commercial power supplies 101A and 101B connected to the converter unit 103, the switcher 102 switches the abnormal power supply to the other power supply. As described above, the load 104 is, for example, a blade server. As such, operation of the load 104 is not allowed to stop due to insufficient power supply, interrupted power supply, or other causes. According to this embodiment, even if supply of power to the switcher 102 is interrupted due to an abnormality in a commercial power supply, the switcher 102 is switched over to ensure that a problem such as malfunction or stoppage of the load 104 is avoided.

The converter unit 103 includes AC-DC converters 103A, 103B, and 103C. The AC-DC converters 103A, 103B, and 103C are connected in parallel. Each of the AC-DC converters 103A, 103B, and 103C, which is connected with one of the commercial power supplies 101A and 101B by the switcher 102, converts an alternating-current voltage (e.g., 200V) supplied from the connected commercial power supply 101A or 101B into a direct-current voltage (e.g., 12V), and supplies the direct-current voltage to the load 104.

The converter unit 103 has redundancy provided by the parallel connection of the AC-DC converters 103A, 103B, and 103C. This means that even if one or two of the AC-DC converters 103A, 103B, and 103C stop due to a failure or other causes, the load 104 can be powered by at least one remaining AC-DC converter. The one or two faulty AC-DC converters can be then replaced while keeping the converter unit 103 running at all times.

Each of the AC-DC converters 103A, 103B, and 103C has a function (so-called current share function) that compares its own output current with the output currents of the other AC-DC converters and performs output current smoothing. That is, the respective output currents of the AC-DC converters 103A, 103B, and 103C are the same. This function helps reduce the amount of output current per AC-DC converter, that is, the amount of current output by each one of the AC-DC converters 103A, 103B, and 103C. The consequent reduction in stress leads to extended lifetime.

A converter is generally designed to have poor efficiency in light-load conditions and maximum efficiency when operated at about 50% of the rated load. Accordingly, if the output current of each AC-DC converter is small, the load is determined to be light, and converter operation is controlled so as to stop one of the AC-DC converters. This causes the output current of each remaining AC-DC converter to increase, thus enabling operation in high-frequency regions.

The battery module 105 includes a controller 105A, a bidirectional DC-DC converter 105B, and a secondary battery 105C. The secondary battery 105C is, for example, a lithium ion battery. According to the present disclosure, the battery module 105 represents an example of "power storage device".

The bidirectional DC-DC converter 105B is connected between the output section of the converter unit 103 and the secondary battery 105C. An example of the bidirectional DC-DC converter 105B is a circuit that is a combination of a step-up chopper and a step-down chopper. The bidirectional DC-DC converter 105B performs bidirectional voltage conversion between the output section of the converter unit 103 and the secondary battery 105C. The bidirectional DC-DC converter 105B outputs the voltage discharged from the secondary battery 105C to the load 104, and also charges the secondary battery 105C with the voltage output from the converter unit 103.

The controller 105A is, for example, a microcomputer. The controller 105A determines whether the secondary battery 105C is connected. If the secondary battery 105C is connected, the controller 105A receives a current share signal as appropriate, and controls the switching operation of the bidirectional DC-DC converter 105B to thereby control the above-mentioned charging and discharging of the secondary battery 105C. The current share signal includes the value of the output current of each of the AC-DC converters 103A, 103B, and 103C smoothed by the current share function. According to the present disclosure, the controller 105A represents an example of "connection determining unit".

The voltage detector 106 is a circuit that detects a voltage input to the converter unit 103. The input voltage to the converter unit 103 is the output voltage from one of the commercial power supplies 101A and 101B connected to the converter unit 103 by the switcher 102. According to the present disclosure, the voltage detector 106 represents an example of "input voltage detector".

The current detector 107 has, for example, a voltage detection resistor. The current detector 107 detects current output from the converter unit 103. The output current from the converter unit 103 is the load current input to the load 104. The current value detected by the current detector 107 can be used to determine whether the load 104 is light or heavy. According to the present disclosure, the current detector 107 represents an example of "output current detector".

If it is determined by the current detector 107 that the load 104 is light, at least one of the AC-DC converters 103A to 103C is stopped by the controller 105A to thereby increase the load factor of at least one running AC-DC converter. This makes it possible to prevent efficiency deterioration.

Figure 2:
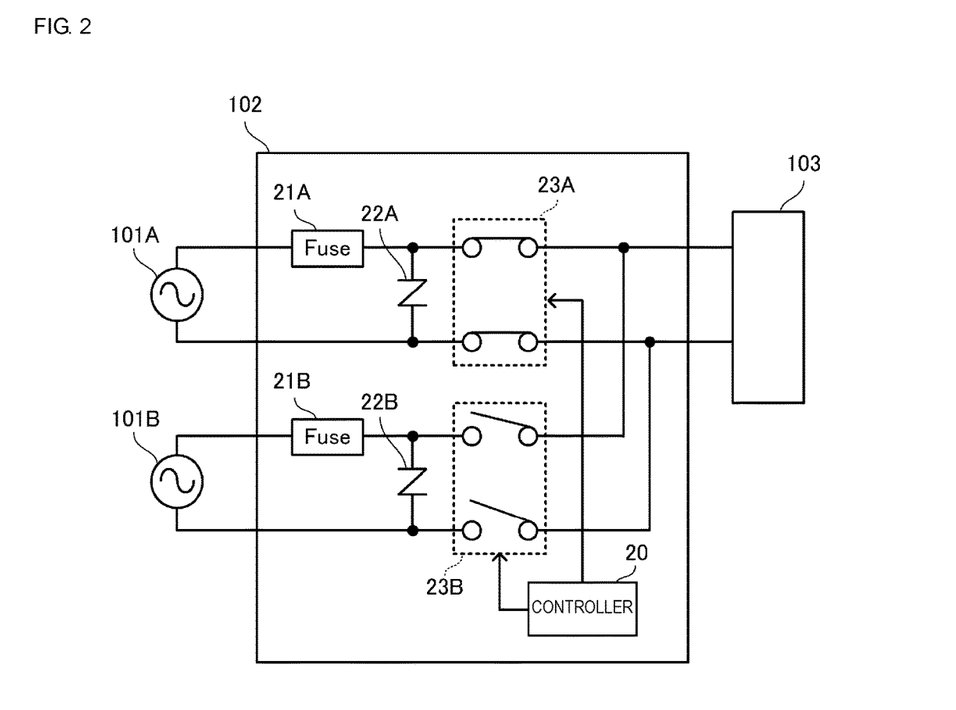
FIG. 2 illustrates the configuration of a switcher.

FIG. 2 illustrates the configuration of the switcher 102.

The switcher 102 has two systems each connected with the commercial power supply 101A or 101B. Each of the two systems includes a fuse 21A or 21B, a varistor 22A or 22B, and a switch unit 23A or 23B. The fuses 21A and 21B provide protection against overcurrents, and the varistors 22A and 22B provide protection against surges.

The switch units 23A and 23B are mechanical relay switches. A controller 20 is configured to cause one of the switch units 23A and 23B to turned on, and causes the other to turn off. When the switch unit 23A is on and the switch unit 23B is off, the commercial power supply 101A is electrically connected with the converter unit 103. When the switch unit 23B is on and the switch unit 23A is off, the commercial power supply 101B is electrically connected with the converter unit 103. Implementing the switch units 23A and 23B as mechanical relay switches makes it possible to reduce on-resistance and consequently heat generation. It is noted that according to the present disclosure, the switch units 23A and 23B each represent an example of "switch element".

Moreover, the controller 20 is configured to execute the following processes described below, including: switchover, abnormality determination, and determination time adjustment. The controller 20 can be configured as each of "abnormality determining unit" (i.e., an "abnormality monitor", "switching control unit", and "time adjustment unit", for example, according to the present disclosure. It should be appreciated that the controller can include a computer processor or similar processing unit that is configured to execute software stored on memory, which, when execute control the components described herein to execute the exemplary algorithms as described below.

(Switchover Process)

Thus, in an exemplary aspect, the controller 20 turns on one of the switch units 23A and 23B, and turns the other off. The controller 20 also switches the switch units 23A and 23B on and off in accordance with the result of an abnormality determination process described later. For example, if the switch unit 23A is on and the switch unit 23B is off, the controller 20 turns the switch unit 23A off and the switch unit 23B on in accordance with the result of the abnormality determination process. That is, the controller 20 switches the commercial power supply to be connected to the converter unit 103, from the commercial power supply 101A to the commercial power supply 101B.

(Abnormality Determination Process)

The controller 20 determines whether there is an abnormality in input voltage input to the converter unit 103. An abnormality in input voltage refers to an abnormality in the commercial power supply 101A or the commercial power supply 101B connected to the converter unit 103 by the switcher 102. The following description assumes that the commercial power supply 101A is connected to the converter unit 103 by the switcher 102, and the controller 20 determines whether there is an abnormality in the commercial power supply 101A. That is, it is assumed that the switch unit 23A is on and the switch unit 23B is off.

The controller 20 counts, for a predetermined amount of time, how many times a voltage value below a reference value is detected by the voltage detector 106. For example, the voltage detector 106 detects voltage every 0.1 ms. The controller 20 determines every 0.1 ms whether the detected voltage value is below a reference value. If the number of times the voltage is below the reference value exceeds a specified value, the controller 20 determines that the commercial power supply 101A is abnormal.

If the commercial power supply 101A is determined to be abnormal, the controller 20 switches the switch unit 23A off and the switch unit 23B on, thus switching the commercial power supply to be connected to the converter unit 103 from the commercial power supply 101A to the commercial power supply 101B. An abnormality in the commercial power supply 101A may either cause voltage supply to the load 104 to stop or cause the supply voltage to drop, leading to malfunction or stoppage of the load 104. Accordingly, instead of the commercial power supply 101A, the controller 20 connects the commercial power supply 101B to the converter unit 103 in such a case to thereby maintain the supply of voltage to the load 104. This makes it possible to avoid malfunction or stoppage of the load 104.

In the above-mentioned abnormality determination process, an abnormality determination, which is a determination of whether there is an abnormality, is made based on how many times a voltage value below a reference value is detected by the voltage detector 106. This makes it possible to increase the accuracy of abnormality determination. This helps eliminate unnecessary switching of the switch units 23A and 23B, thus reducing the number of times switching is performed. Since the switch units 23A and 23B are mechanical relay switches, frequently switching the switch units 23A and 23B leads to reduced product lifetime, and also reduced reliability due to degradation or other causes. Accordingly, by minimizing the number of times the switch units 23A and 23B are switched, the switch units 23A and 23B can be extended in lifetime, and also improved in reliability.

Alternatively, an abnormality determination may be made based on the frequency, waveform, or other characteristics of an input voltage.

(Determination Time Adjustment Process)

The controller 20 adjusts, based on the value of current detected by the current detector 107, the amount of time for which an abnormality determination process is executed (to be referred to as determination time hereinafter). The controller 20 determines whether the load 104 is light based on the value of current detected by the current detector 107, that is, based on load current. If the load 104 is light, the controller 20 increases the determination time. If the load 104 is heavy, the controller 20 decreases the determination time.

For example, the load 104 may be determined to be heavy if all of the AC-DC converters 103A to 103C are being run by the controller 105A and if the load factor is greater than or equal to 50% of the rated load. The current value detected by the current detector 107 at this time is defined as first threshold. The load 104 may be determined to be light if there is any converter that is not running among the AC-DC converters 103A to 103C. The current value detected by the current detector 107 at this time is defined as second threshold.

If the load 104 is light, increasing the determination time helps minimize unnecessary switching of the switch units 23A and 23B. For example, even when supply of input voltage is interrupted due to a momentary interruption of power supply, if the load 104 is light, it is possible in some cases to keep the load running for a predetermined amount of time (e.g., 20 ms) with the voltage stored in a capacitor within the power supply system 100, for example, a capacitor within the converter unit 103.

Now, it is assumed that the determination time is 10 ms, and recovery from momentary interruption occurs within 20 ms of the occurrence of momentary interruption. In this case, the load 104 can continue to be driven without switching the switch units 23A and 23B. Unless the control of the determination time mentioned above is performed, the input voltage is determined to be abnormal within the determination time, and thus the switch units 23A and 23B are switched. That is, unnecessary switching of the switch units 23A and 23B is performed. According to this embodiment, the determination time is increased (e.g., to 20 ms) so that recovery from momentary power interruption occurs before the abnormality determination ends. This makes it possible to avoid the unnecessary switching of the switch units 23A and 23B mentioned above. As a result, the switch units 23A and 23B can be extended in lifetime, and also improved in reliability.

Increasing the determination time also helps prevent erroneous determination due to noise or other causes, thus making it possible to provide an accurate determination.

If the load 104 is heavy, it is possible that driving of the load 104 may stop in a short time due to insufficient supply voltage. Accordingly, the determination time is decreased so that the controller 20 executes abnormality determination for the commercial power supply 101A in a short time. Then, the controller 20 turns the switch unit 23A off and the switch unit 23B on. This causes the commercial power supply 101B to be connected to the converter unit 103. As a result, voltage supply to the load 104 is maintained by means of the commercial power supply 101B, thus making it possible to avoid malfunction or stoppage of the load 104.

Further, the controller 20 acquires, from the controller 105A of the battery module 105, information indicative of whether the secondary battery 105C is connected. If the secondary battery 105C is connected, the controller 20 increases the determination time irrespective of whether the load 104 is light or heavy. If the secondary battery 105C is connected, the secondary battery 105C assists in supplying power to the load 104. Consequently, even if there is an abnormality in the input voltage to the converter unit 103, power is supplied to the load 104 from the secondary battery 105C. As a result, operation of the load 104 does not stop immediately. Accordingly, as with when the load 104 is light, the determination time is increased in this case to thereby increase the accuracy of abnormality determination.

If the secondary battery 105C assists in supplying power, it is not necessary to switch the switch units 23A and 23B at high speed. This eliminates the need to use switches capable of high speed switching, leading to reduced cost.

The processes to be executed by the controller 20 may be executed by another component. For example, the power supply system 100 may include a controller that controls the entire power supply system 100, and the controller may execute the above-mentioned processes.

Figure 3:
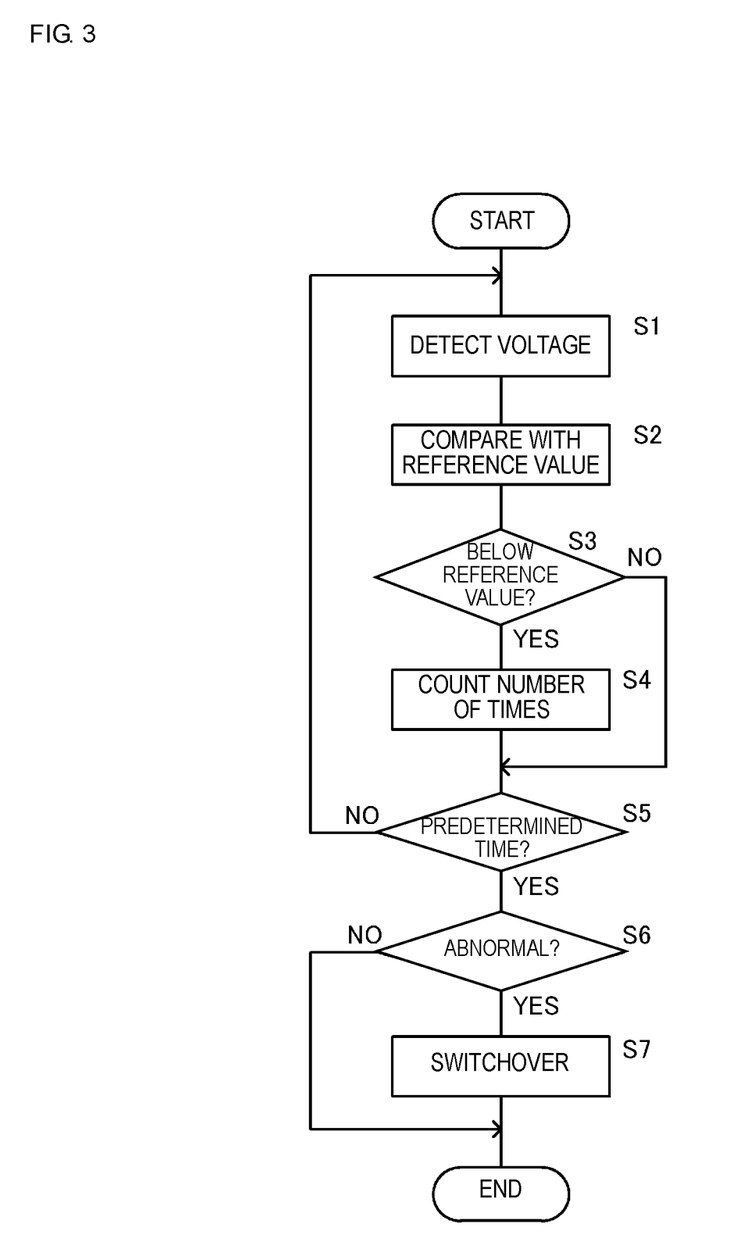
FIG. 3 is a flowchart of each of an abnormality determination process and a switchover process that are executed by a controller.

FIG. 3 is a flowchart of each of an abnormality determination process and a switchover process that are executed by the controller 20.

The controller 20 acquires the value of voltage detected by the voltage detector 106 (S1), and compares the voltage value with a reference value (S2). If the voltage value detected by the voltage detector 106 falls below the reference value (S3: YES), the controller 20 counts the number of times this occurs (S4). If the voltage value does not fall below the reference value (S3: NO), the controller 20 executes S5 without taking such a count.

If a predetermined amount of time has not elapsed since the start of this process (S5: NO), the controller 20 executes S1. If the predetermined amount of time has elapsed (S5: YES), the controller 20 determines whether there is an abnormality in input voltage based on whether the number of times counted by the controller 20 exceeds a specified value (S6). If the input voltage is determined to be abnormal (S6: YES), the controller 20 switches the switch units 23A and 23B (S7). For example, if the switch unit 23A is on and the switch unit 23B is off, the controller 20 turns the switch unit 23A off and the switch unit 23B on. If the input voltage is not abnormal (S6: NO), the controller 20 ends this process.

Figure 4:
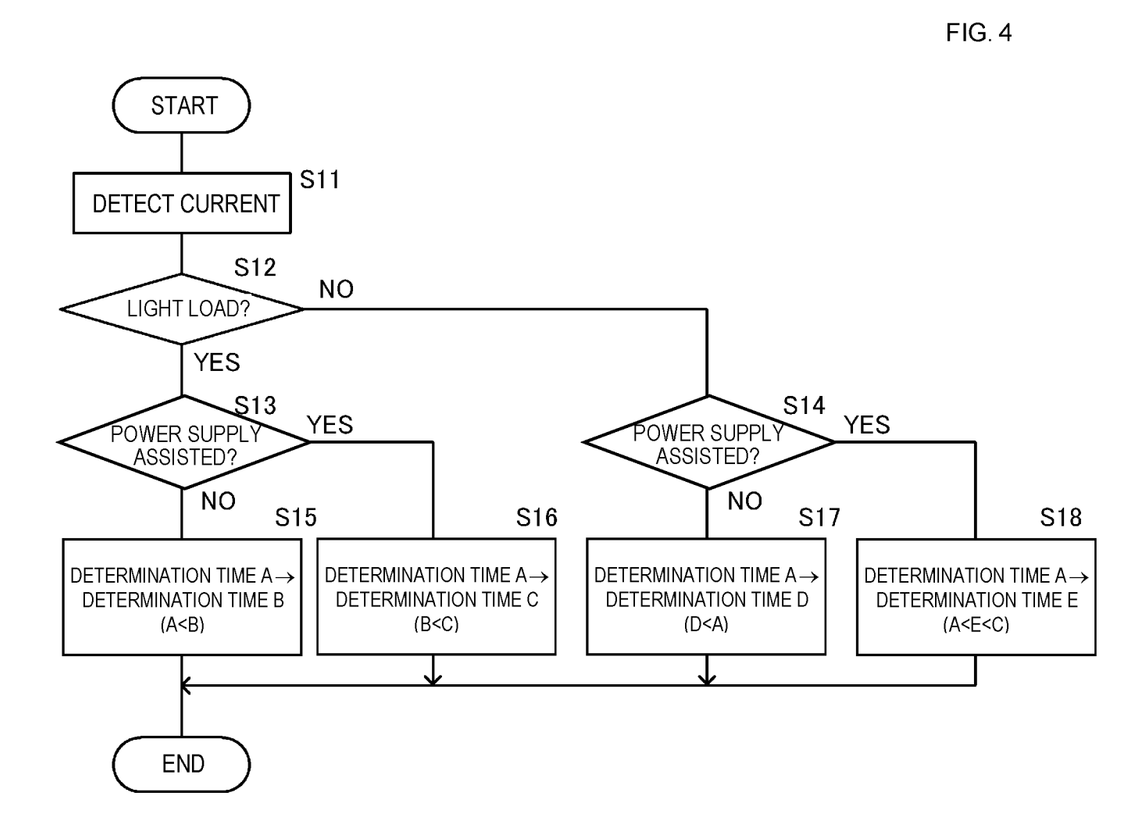
FIG. 4 is a flowchart of a determination time adjustment process executed by a controller.

FIG. 4 is a flowchart of a determination time adjustment process executed by the controller 20. In the following description, the default determination time with no time adjustment is represented by Determination Time A.

The controller 20 acquires the value of current detected by the current detector 107 (S11), and determines, from the acquired current value, whether the load 104 is light (S12). If the load 104 is light (S12: YES), the controller 20 determines whether power supply to the load 104 is being assisted by power from the secondary battery 105C (S13). If power supply is not being assisted (S13: NO), the controller 20 sets the determination time to Determination Time B, which is longer than Determination Time A (S15). If power supply is being assisted (S13: YES), the controller 20 sets the determination time to Determination Time C, which is even longer than Determination Time B (S16).

If the load 104 is not light (S12: NO), that is, if the load 104 is heavy, the controller 20 determines whether power supply to the load 104 is being assisted by power from the secondary battery 105C (S14). If power supply is not being assisted (S14: NO), the controller 20 sets the determination time to Determination Time D, which is shorter than Determination Time A (S17). If power supply is being assisted (S14: YES), the controller 20 sets the determination time to Determination Time E, which is longer than Determination Time A and shorter than Determination Time C (S18).

As described above, the determination time, which is the amount of time for which an abnormality determination process is performed, is adjusted in accordance with whether the load 104 is light or heavy. This makes it possible to increase the accuracy of abnormality determination, and also maintain voltage supply to the load 104 to avoid malfunction or stoppage of the load 104. Further, unnecessary switching of the switch units 23A and 23B is minimized. As a result, the switch units 23A and 23B can be extended in lifetime, and also improved in reliability.

Although each of the switch units 23A and 23B is a mechanical relay switch in this embodiment, each switch unit may be a hybrid switch including a mechanical relay switch and a semiconductor switch.

Figure 5:
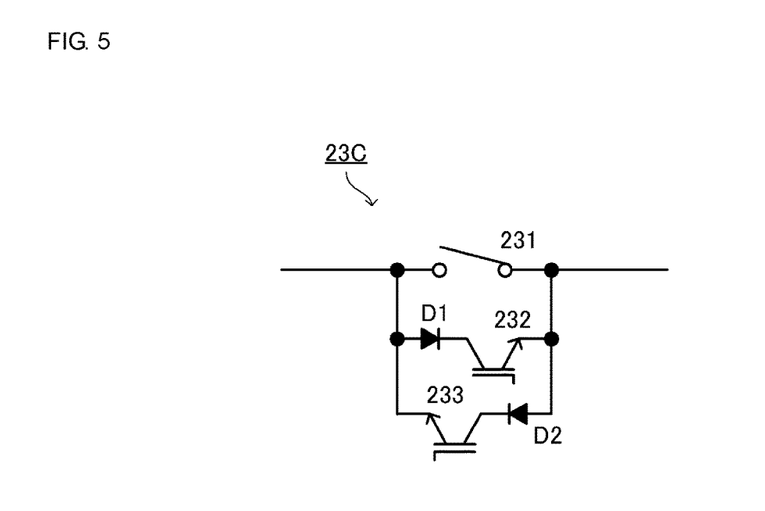
FIG. 5 illustrates an exemplary hybrid switch.

FIG. 5 illustrates an example of a hybrid switch 23C.

The hybrid switch 23C is formed by connecting the following components in parallel: a mechanical relay switch 231, a series circuit of a diode D1 and a transistor 232, and a series circuit of a diode D2 and a transistor 233. The rectification direction of the series circuit of the diode D1 and the transistor 232, and the rectification direction of the series circuit of the diode D2 and the transistor 233 are opposite to each other. Because the hybrid switch 23C includes two series circuits, the hybrid switch 23C can be used for any line through which alternating current flows.

With the above-mentioned configuration, the controller 20 turns on only the mechanical relay switch 231, and electrically connects the commercial power supply 101A or 101B with the converter unit 103. Since the on-resistance of the mechanical relay switch 231 is small, loss can be reduced, and heat generation can be minimized. In switching the commercial power supply to be connected to the converter unit 103 when an abnormality occurs, the controller 20 turns the transistors 232 and 233 on, and switches the mechanical relay switch 231 during the on-period. Since switching of the mechanical relay switch 231 takes time, using the transistors (e.g., IGBTs) 232 and 233 capable of switching at high speed allows for improved switching speed.

The following describes operation of the hybrid switch 23C when an abnormality occurs in input voltage.

Figure 6:
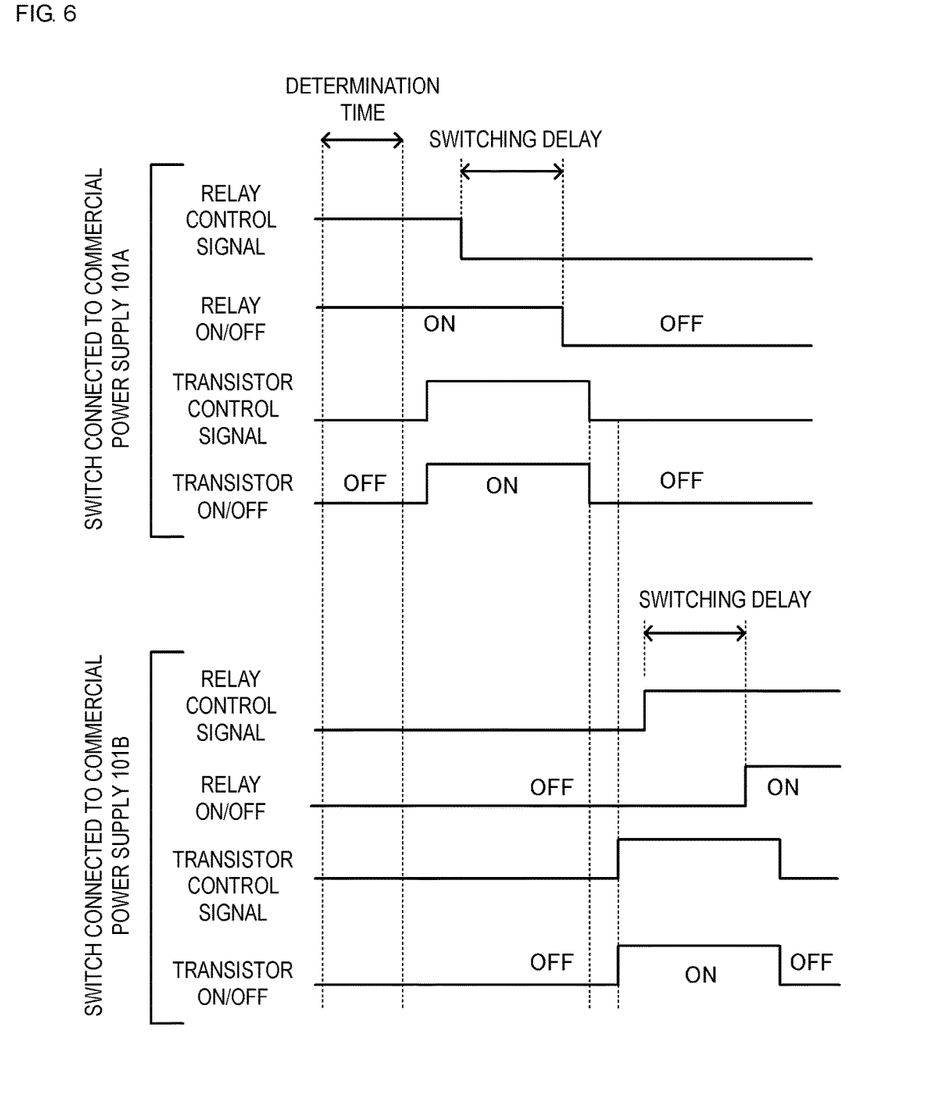
FIG. 6 is a timing chart for a hybrid switch.

FIG. 6 is a timing chart for the hybrid switch 23C. The upper part of FIG. 6 is a timing chart for the hybrid switch 23C connected to the commercial power supply 101A, and the lower part is a timing chart for the hybrid switch 23C connected to the commercial power supply 101B. FIG. 6 is a timing chart for a case where, with the commercial power supply 101A connected to the converter unit 103, the input voltage is determined to be abnormal, and thus the commercial power supply to be connected to the converter unit 103 is switched to the commercial power supply 101B.

When the controller 20 determines that the commercial power supply 101A is abnormal, the controller 20 outputs a control signal to each of the transistors 232 and 233 corresponding to the commercial power supply 101A. In response to the output of the control signal, the transistors 232 and 233 turn on with substantially no delay. When the transistors 232 and 233 turn on, the controller 20 outputs a control signal for turning on the mechanical relay switch 231 to the mechanical relay switch 231 corresponding to the commercial power supply 101A. After the control signal is output, the mechanical relay switch 231 turns off with a delay. Turning off the mechanical relay switch 231 during the on-time of the transistors 232 and 233 as described above makes it possible to prevent arc generation. After the mechanical relay switch 231 turns off, the controller 20 also turns off the transistors 232 and 233. This cuts off the connection between the commercial power supply 101A and the converter unit 103.

Subsequently, the controller 20 outputs a control signal to the transistors 232 and 233 corresponding to the commercial power supply 101B to thereby turn on the transistors 232 and 233. This establishes a connection between the commercial power supply 101B and the converter unit 103, and supply of power from the commercial power supply 101B is started. The controller 20 outputs, during the on-time of the transistors 232 and 233, a control signal for turning on the mechanical relay switch 231 corresponding to the commercial power supply 101B. The mechanical relay switch 231 turns on with a delay after the output of the control signal. After the mechanical relay switch 231 turns on, the controller 20 turns off the transistors 232 and 233. As a result, the commercial power supply 101B and the converter unit 103 are connected to each other by means of the mechanical relay switch 231 with low on-resistance and low heat generation.

REFERENCE SIGNS LIST

D1, D2 diode
20 controller
21A fuse
22A varistor
23A, 23B switch unit
23C hybrid switch
100 power supply system
101A, 101B commercial power supply
102 switcher
103 converter unit
103A AC-DC converter
104 load
104A, 104B, 104C load
105 battery module
105A controller
105B Bidirectional DC-DC converter
105C secondary battery
106 voltage detector
107 current detector
141 controller
231 mechanical relay switch
232, 233 transistor

The invention claimed is:
1. A power supply system comprising:
a converter configured to convert an input alternating-current voltage into a direct-current voltage and output the direct-current voltage to a load, the converter including a plurality of AC-DC converters that are arranged in parallel so as to convert a common alternating-current input voltage into a common direct-current output voltage;
an operation controller configured to control the plurality of AC-DC converters based on a state of the load;
a switch element configured to electrically connect one of a plurality of alternating-current power supplies to the converter;

an input voltage detector configured to detect an input voltage input to the converter;

an output current detector configured to detect an output current output from the converter;

an abnormality monitor configured to repeat, for a predetermined amount of time, a determination of whether there is an abnormality in alternating-current power supply to the converter based on an input voltage detected by the input voltage detector;

a switching controller configured to switch the switch element to switch which one of the plurality of alternating-current power supplies is connected to the converter if the abnormality monitor determines detects an abnormality; and a time adjustment unit configured to adjust the predetermined amount of time based on a detection value detected by the output current detector.

2. The power supply system according to claim 1, wherein the time adjustment unit is further configured to decrease the predetermined amount of time if the detection value detected by the output current detector is an output current above a first threshold.

3. The power supply system according to claim 1, wherein the time adjustment unit is further configured to increase the predetermined amount of time if the detection value detected by the output current detector is an output current below a second threshold.

4. The power supply system according to claim 2, wherein the first threshold is a value of the output current when all of the plurality of AC-DC converters are operating and when a load factor of each AC-DC converter is 50%.

5. The power supply system according to claim 3, wherein the second threshold is a value of output current when the operation control unit determines to stop one of the plurality of AC-DC converters.

6. The power supply system according to claim 1, wherein the switch element is a mechanical relay switch.

7. The power supply system according to claim 1, wherein the switch element is a hybrid switch that includes a mechanical relay switch and a semiconductor switch.

8. The power supply system according to claim 7, wherein the semiconductor switch includes a first series circuit with a first diode and a first transistor and a second series circuit with a second diode and a second transistor.

9. The power supply system according to claim 8, wherein the first series circuit comprises a rectification direction that is opposite to a rectification direction of the second series circuit.

10. The power supply system according to claim 1, further comprising a power storage device configured to be detachably connect in parallel to the converter.

11. The power supply system according to claim 10, further comprising a connection determining unit configured to determine when the power storage device is connected in parallel to the converter.

12. The power supply system according to claim 11, wherein the time adjustment unit is configured to increase the predetermined amount of time if the connection determining unit determines that the power storage device is connected, and to decrease the predetermined amount of time if the connection determining unit determines that the power storage device is not connected.

13. The power supply system according to claim 1, wherein the switch element comprises at least one fuse configured to prevent overcurrent from at least one of plurality of alternating-current power supplies.

14. The power supply system according to claim 1, wherein the switch element comprises at least one varistor configured to prevent a surge from at least one of the plurality of alternating-current power supplies.

15. The power supply system according to claim 1, wherein the abnormality monitor is further configured to count during the predetermined amount of time a number of times the input voltage detected by the input voltage detector is below a reference value.

16. The power supply system according to claim 15, wherein the abnormality monitor is further configured to determine the abnormality if the counted number of times that the input voltage is below the reference value during the predetermined amount of time exceeds a predetermined value.

* * * * *